Jan. 23, 1951     J. P. RUDOLPH     2,538,916

GAS TORCH

Filed June 11, 1948

INVENTOR
JACOB P. RUDOLPH
BY
ATTORNEYS

Patented Jan. 23, 1951

2,538,916

UNITED STATES PATENT OFFICE 2,538,916

GAS TORCH

Jacob P. Rudolph, North Arlington, N. J., assignor to Air Reduction Company, Incorporated, a corporation of New Jersey Application June 11, 1948, Serial No. 32,432

4 Claims. (Cl. 158—27.4)

This invention relates to gas torches of the type used in metal cutting and scarfing operations.

Scarfing torches of the kind used in the hand scarfing of metal billets and the like are often subjected to abuse and wear which they are not adapted to withstand. The torch head in particular receives the brunt of the hard use and is especially vulnerable to the damaging effects.

Recently with the increase in use of powdered flux in the oxygen stream when either cutting or scarfing work-pieces it has been found that the interiors of torch heads are also seriously damaged by the erosive effect of the flux particles.

The reason why the heads of scarfing and cutting torches are so vulnerable to these various damaging effects is that heretofore it has not been possible to make them out of a metal that has high wear resistance because it has been necessary to use a metal that can be more readily machined, such as brass, in order to permit seating surfaces and threads to be machined in them for the scarfing or cutting tip and the tip nut that holds it in place, and such metals are not resistant to the damaging effects. As a consequence it has heretofore been necessary to frequently replace the heads of scarfing and cutting torches.

The principal object of this invention is to provide a scarfing or cutting torch having a head which is highly resistant to damaging effects of the kind above mentioned and yet may be readily machined to provide the various seating surfaces and threads that are necessary for attaching the torch tip to the head.

According to the invention the head of the torch is made for the most part out of a metal that is highly wear-resistant and is so constructed that metal ring-shaped inserts, made of metal that can be readily machined, may be secured within the torch head, the inserts permitting the necessary seating surfaces to be machined for cooperation with corresponding surfaces on the torch tip and permitting threads to be machined for cooperation with corresponding threads on the tip nut that clamps the tip to the torch head.

A hand scarfing torch having a head made in accordance with the invention is illustrated in the accompanying drawing, in which.

Figure 1:
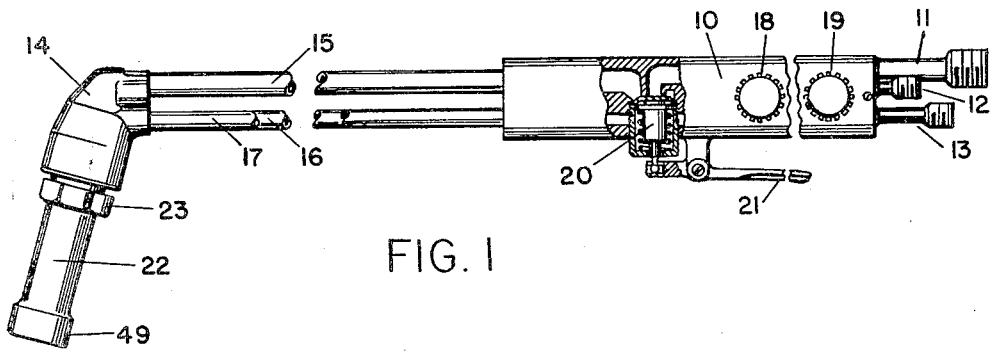
Figure 1 is a broken side elevation of the torch, a part of the handle portion where the scarfing oxygen valve is located being shown in vertical section.

Referring first to Fig. 1, the hand scarfing torch therein illustrated comprises a valve block 10 which also forms a handle portion by which the torch may be held. Scarfing oxygen enters the valve block 10 through a fitting 11. Preheat oxygen, and a fuel-gas such as acetylene, enter the valve block through fittings 12 and 13 respectively. The head of the torch is shown at 14. It is connected to the handle portion 10 by a tube 15 which conducts the scarfing oxygen from the handle portion to the head, and by tubes 16 and 17 which conduct the acetylene and the preheat oxygen respectively from the handle portion to the head. Two valves 18 and 19 control the flow of preheat oxygen and acetylene respectively to the torch head, and a valve 20 operable by means of a handle 21 controls the flow of scarfing oxygen to the torch head. The torch tip is shown at 22. It is clamped to the head by means of a tip nut 23. Scarfing oxygen is delivered by the torch head to a central jet passage in the tip, and the preheat oxygen and acetylene are delivered by the torch head to preheat jet passages in the tip in which these gases are mixed and fed to the preheating flames. The arrangement of the gas passages in the torch head and the tip by which this is accomplished will be clear from the other figures of the drawing now to be described.

Figure 2:
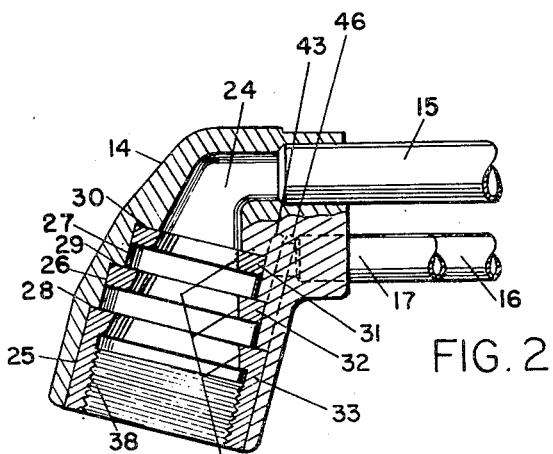
Fig. 2 shows the torch head alone in vertical section.

The interior construction of the torch head 14 is shown in Fig. 2. The scarfing oxygen tube 15 delivers the scarfing oxygen to a central passage 24 which communicates with an enlarged opening in the forward or tip-receiving end of the head. This opening is formed by three recesses which successively increase in diameter toward the tip-receiving end of the head. The recess of largest diameter at the tip-receiving end of the head is designated 25. The other two successively smaller recesses are designated 26 and 27 respectively. This results in the formation of a shoulder 28 where the recess 25 joins the recess 26, and a similar shoulder 29 where the recess 26 joins the recess 27. It also forms a shoulder 30 where the smallest recess 27 joins the central passage 24 in the head. A ring-shaped metal insert 31 is positioned in the smallest recess 27 and seats against the shoulder 30. A similar but larger ring-shaped metal insert 32 is positioned in the next larger recess 26 and seats against the shoulder 29. The largest recess 25 receives a still larger ring-shaped metal insert 33 which seats against the shoulder 28. All three inserts are preferably soldered in place to insure gas-tight joints at the shoulders against which they seat as well as at the cylindrical walls of the recesses.

Each of the ring inserts is provided at its inner circumference with a carefully machined tapered face 34. These three faces are so formed that they jointly form a conical seat for the usual conical upper end of a conventional torch tip 10. More specifically the three tapered faces 34 constitute three separate seats for three zones 35 (Fig. 3) of the conical upper end of the torch tip, these three zones on the tip being formed by providing the conical end of the tip with two encircling parallel grooves 36 and 37. The largest ring insert 33 in the torch head is provided with interior threads 38, and the tip nut 23 (Fig. 3) is provided with an exteriorly threaded sleeve portion 39 so that when the conical upper end of the tip is inserted into the torch head the threaded sleeve portion of the tip nut can be screwed into the interiorly threaded ring insert 33 until the upper end 40 of the threaded sleeve of the tip nut engages with a shoulder 41 on the tip and firmly seats the three conical zones 35 of the tip against the tapered faces 34 of the three ring inserts in the torch head. When the tip is thus attached to the torch head the encircling groove 36 in the conical end of the tip registers with the space between the ring inserts 31 and 32 in the torch head to provide an annular gas chamber to which the preheat oxygen is delivered from the tube 17 as hereinafter described, and the other encircling groove 37 in the conical end of the tip registers with the space between the ring inserts 32 and 33 to form another annular gas chamber to which the acetylene is delivered from the tube 16, as also hereinafter described.

Preheat oxygen enters the torch head 14 from the tube 17 through a short passage 42 (Fig. 4) which communicates with a cavity 43 (Figs. 2 and 4) which extends downwardly through the wall of the torch head and terminates at the shoulder 29 so that it is closed at its lower end by the ring insert 32. The cavity 43 opens through the wall of the recess 27 so that preheat oxygen is admitted to the above-mentioned annular gas chamber formed by the ring inserts 31 and 32 and by the groove 36 in the torch tip. From this chamber the preheat oxygen enters the usual preheat jet passages 44 in the torch tip (Fig. 3).

Figures 3, 4:
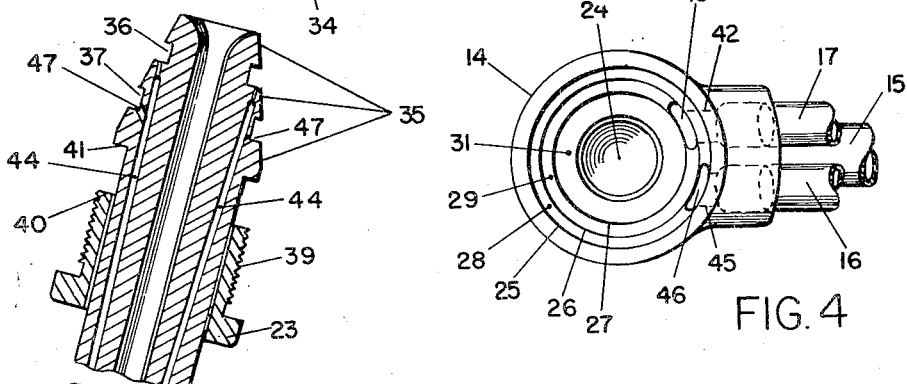
Fig. 3 shows the torch tip in vertical section in position to be attached to the torch head.
Fig. 4 is a bottom view of the torch head before the torch tip is attached to it and with two of the metallic inserts removed.

The acetylene enters the torch head 14 from the tube 16 through a short passage 45 (Fig. 4) which communicates with another cavity 46 (Figs. 2 and 4). This second cavity is spaced circumferentially from the cavity 43 and extends downwardly through the wall of the torch head and terminates at the shoulder 28 so that it is closed at its lower end by the ring insert 33. The cavity 46 opens through the wall of the recess 26 and thus delivers the acetylene to the above-mentioned gas chamber formed by the ring inserts 32 and 33 and by the groove 37 in the torch tip. Diagonal drillings 47 in the torch tip (Fig. 3) conduct the acetylene from this annular gas chamber to the above-mentioned preheat jet passages 44 in the tip where it mixes with the preheat oxygen passing through them. The mixture of acetylene and preheat oxygen discharged from the preheat jet passages 44 feeds the preheating flames, as is well understood in the art.

The scarfing oxygen delivered to the torch head by the tube 15 passes through the central passage 24 (Fig. 2) into the central jet passage 48 in the torch tip (Fig. 3) which discharges it at the face of the tip as a scarfing oxygen jet.

A scarfing or desurfacing operation of the kind for which the above-described torch is adapted is performed by heating a portion of the surface of a metal body to kindling temperature, and then directing a jet of scarfing oxygen against the heated portion of the surface. The oxidizing reaction, once started, may be advanced progressively along the surface by inclining the torch tip and translating it in the direction in which it is pointed to produce a groove extending along the surface of the work. The preheating of the metal of kindling temperature may be done by placing the entire work-piece in a furnace but is usually done by means of the preheating flames projected from the torch tip. It should be noted that Fig. 1 does not give the correct impression of the length of the usual hand scarfing torch since this figure is a broken fore-shortened view. Actually, hand scarfing-torches are as much as four feet in length and weigh as much as twenty pounds. The operator grasps the torch in both hands, and the gas tubes 15, 16 and 17 are of such length as to permit him to walk in an upright position while moving the tip of the torch along the path to be scarfed. The operator holds the torch with the tip at the desired angle to the work surface, and as he moves the torch along the work, he usually permits the end of the tip to make contact with the work surface so that the greater part of the weight of the torch is carried by the tip. For this reason a ring 49 of wear-resistant metal is usually provided at the extreme end of the torch tip. Billets and similar work-pieces to be scarfed are usually of considerable length, so after each pass, the operator in returning the torch to starting position, usually walks back to the end of the billet and drags the torch alongside him by sliding the torch head on the billet surface in order to save himself the effort of carrying the torch. This practice has become so prevalent that many devices have been tried in an attempt to prevent the excessive wear that it produces on the torch head. For instance, it has been proposed to provide a ridge along the back of the torch head, or make the rear wall of the torch head of greater thickness than usual. While such things lengthen the life of the torch head to a small extent, they are objectionable because of the added weight they give to the torch.

According to the present invention the torch head 14, except for the ring inserts, is made of a metal that is highly resistant to wear. Any suitable wear-resistant metal may be employed such as a cobalt base alloy or a nickel base alloy. These alloys contain large percentages of chromium, or chromium and tungsten, as well as other alloying constituents and are characterized by their extreme hardness. Their hardness causes them to be brittle, however, to the extent that their ductility is low and they can not be readily forged and machined. For this reason the torch head is preferably cast with the above described recesses and cavities cast directly in it so that no subsequent machining of the casting is necessary. In this way the poor machining qualities of the hard metal employed for the head will not present any added difficulty in the manufacture of the head. A suitable alloy from which the torch head may be cast contains approximately 2.5% carbon, 31–35% chromium, 45–50% cobalt, and 12–15% tungsten.

It is essential that each of the tapered faces 34 on the ring inserts in the head be in gas-tight engagement with the corresponding conical portions 35 on the torch tip, when the tip is clamped in the head, to prevent leakage of gases between the several gas chambers or to the atmosphere. This must be accomplished by precise machining of these faces. Therefore the three ring inserts 31, 32 and 33 are made of a metal that is adapted to be machined to within reasonably close tolerances and to retain a smooth finish. Brass or Monel metal has been found most satisfactory for this purpose. Making the ring inserts out of a readily machinable metal of this kind also permits the threads 38 to be machined in the ring insert 33.

It will now be seen that the provision of the inserts in the torch head as above described permits the portion of the head that is subjected to wear and abuse to be made of wear-resistant hard metal and permits the necessary seating surfaces for the tip, and the threads for the tip nut, to be machined in metal that is softer and more machinable. Torch heads made of wear-resistant metal and provided with machinable metal inserts in accordance with the invention may be made of ordinary thickness and weight, thereby preserving the ease with which the torch can be manipulated.

While the invention has been specifically described as applied to a hand scarfing torch it will be understood that it is also applicable to cutting torches, especially those used for cutting operations in which a powdered flux is carried through the torch in the oxygen stream. Since the invention makes it possible to make the torch head out of wear-resistant metal, the interior surfaces afford greater resistance to the erosive effect of the flux particles passing through the head than do the interior surfaces of the present conventional torch heads.

I claim:

1. In a gas torch the combination of a head, a tip having a conical end portion adapted to be inserted in the head and provided with an encircling groove, ring-shaped inserts positioned in the head in parallel spaced relation and having tapered inner faces forming seats for the conical portions of the tip at opposite sides of said encircling groove, means for clamping the tip in the head with said conical portions of the tip seated on said tapered inner faces of the inserts, the encircling groove in the tip and the two ring-shaped inserts then forming an annular gas chamber, means for supplying a gas to said annular gas chamber, and at least one jet passage in the tip communicating with said annular gas chamber.

2. A combination in accordance with claim 1 in which the head is provided with circular concentric recesses which successively increase in diameter toward the tip-receiving end of the head and in which said ring-shaped inserts are positioned and secured in a gas-tight manner.

3. In a gas torch the combination of a head, a tip having a conical end portion adapted to be inserted in the head and provided with a pair of parallel encircling grooves which divide the conical end of the tip into three conical zones, three ring-shaped inserts positioned in the head in parallel spaced relation and having tapered inner faces forming seats for said three conical zones of the tip, means for clamping the tip in the head with said conical zones of the tip seated on said tapered inner faces of the inserts, the two encircling grooves in the tip and the three ring-shaped inserts then forming two annular gas chambers, means for supplying a gas to each of said annular gas chambers, and at least one jet passage in the tip which is in communication with both of said annular gas chambers.

4. A combination in accordance with claim 3 in which the head is provided with three circular concentric recesses which successively increase in diameter toward the tip-receiving end of the head and in which said three ring-shaped inserts are positioned and secured in a gas-tight manner.

JACOB P. RUDOLPH.

REFERENCES CITED

The following references are of record in the file of this patent:

UNITED STATES PATENTS

| Number | Name | Date |
|---|---|---|
| 1,631,007 | Bucknam | May 31, 1927 |
| 2,363,250 | Jenkins | Nov. 21, 1944 |
| 2,365,411 | Jacobsson | Dec. 19, 1944 |
| 2,368,716 | Marra | Feb. 6, 1945 |
| 2,442,414 | Jacobsson | June 1, 1948 |

FOREIGN PATENTS

| Number | Country | Date |
|---|---|---|
| 683,831 | Germany | Dec. 3, 1937 |